United States Patent [19]

Kamata et al.

[11] Patent Number: 5,086,647
[45] Date of Patent: Feb. 11, 1992

[54] POWER TESTING APPARATUS

[75] Inventors: Ryoji Kamata; Saburo Ozawa, both of Tokyo, Japan

[73] Assignee: Kabushiki Kaisha Meidensha, Japan

[21] Appl. No.: 518,878

[22] Filed: May 4, 1990

[30] Foreign Application Priority Data

May 8, 1989 [JP] Japan ................... 1-52390

[51] Int. Cl.⁵ .................. G01M 15/00; G01L 3/16
[52] U.S. Cl. .................... 73/117; 73/862.09; 73/862.12; 73/862.17
[58] Field of Search .............. 73/117, 862.09, 862.17, 73/862.18, 862.12, 862.13, 123, 125; 310/74

[56] References Cited

U.S. PATENT DOCUMENTS

| | | | |
|---|---|---|---|
| 2,749,747 | 6/1956 | Cline | 73/117 |
| 3,712,127 | 1/1973 | Petersen | 73/862.14 X |
| 3,913,394 | 10/1975 | Niehaus | 73/862.09 X |
| 4,466,294 | 8/1984 | Bennington et al. | 73/862.13 |

Primary Examiner—Charles A. Ruehl
Attorney, Agent, or Firm—Ronald P. Kananen

[57] ABSTRACT

A power testing apparatus includes a brake mechanism which is operated to brake an inertial load adjusting flywheel at a desired timing. A clutch is provided for controlling transmission of an inertial load from the adjusting flywheel to a tested object. Particular advantage of providing the brake mechanism for the adjusting flywheel is that the brake mechanism is adapted to brake the adjusting flywheel when the adjusting flywheel is rotating idle where no inertial load is applied to the tested object due to the clutch being disengaged.

12 Claims, 3 Drawing Sheets

POWER TESTING APPARATUS

BACKGROUND OF THE INVENTION

1. Field of the Invention

The present invention relates generally to a power testing apparatus, and more specifically, to such a power testing apparatus that can brake rotation of a flywheel means independently of braking a rotation shaft thereof.

2. Description of the Background Art

In a power testing apparatus, a dynamometer and a tested object are drivingly coupled with each other in a direct or indirect manner for driving the dynamometer by the tested object or driving the tested object by the dynamometer to measure an output power of the tested object, a rotational resistance of the tested object, and so forth.

In one type of the power testing apparatus, such as a chassis dynamometer for testing vehicular engine performance or the like, driving wheels of a vehicle to be tested are placed on a pair of rollers which are coupled to each other with a common rotation shaft. An electric dynamometer has a rotation shaft which is drivingly connected to one end of the common shaft of the rollers through a coupling for co-rotation therewith. A rotation shaft of a flywheel unit is further coupled with another end of the common shaft of the rollers through a coupling for co-rotation therewith. In general, the flywheel unit includes fixed flywheels and adjusting flywheels. The fixed flywheels apply a predetermined inertial load to the tested object all through the power testing. On the other hand, each of the adjusting flywheels selectively applies a inertial load to the tested object through a clutch according to a required mode of the power testing.

As is known, when testing acceleration performance or climbing performance of the tested vehicle, a body weight, i.e. inertial mass of the vehicle is a decisive factor for measuring the respective performance. In the chassis dynamometer power testing, however, since the tested vehicle does not move relative to the power testing apparatus, the body weight does not directly become a driving load, i.e. an inertial load against the operation of a vehicular engine. Accordingly, the flywheel unit is provided for forming an actual engine load simulated inertial load which is variable according to the required simulation mode of the power testing.

In a practical use of the power testing apparatus as described above, the clutches are first set to engage so as to drivingly connect the adjusting flywheels to the rotation shaft of the flywheel unit. Accordingly, the engine load simulated inertial loads are fully applied to the tested vehicle. Subsequently, the clutches are set to disengage one by one for reducing the inertial load applied to the tested vehicle, which is required for smooth operation of the clutch, i.e. the disengagement of the clutch is easily performed even with the rotation shaft of the flywheel unit and the adjusting flywheel being rotated. Accordingly, the reducing of the inertial load applied to the tested vehicle can be performed while the power testing is being made. On the other hand, the engagement of the clutch in the same condition is undesirable due to a possibility of the clutch to be damaged, particularly in case of a toothed clutch being utilized. Accordingly, in the practical use of the power testing apparatus, as noted above, the clutches are engaged when starting the power testing, which are then disengaged one by one while the power testing is being made. As appreciated, the disengaged flywheels continue to rotate idle, which raises a problem.

When a series of the power test is finished, the rotation shafts of the dynamometer, the rollers and the flywheel unit are braked together by means of a disc brake to stop their rotation for replacing the tested vehicle with a new vehicle to be tested. As noted above, when starting another power test, the adjusting flywheels are coupled to the rotation shaft of the flywheel unit through the clutches.

It is to be appreciated that since each adjusting flywheel is supported on the rotation shaft of the flywheel unit through a roller bearing having a very small rotational resistance and the inertial mass of each adjusting flywheel is set considerably large, each flywheel continues to rotate idly about the rotation shaft of the flywheel unit unlimitedly with no external force applied thereto. Accordingly, it has been likely to happen that when starting the power testing for the new vehicle with the rotation shafts being stopped, the adjusting flywheels are still rotating idly. As mentioned above, the engagement of the clutch, while there is a difference in speed between the rotation shaft of the flywheel unit and the adjusting flywheel, is undesirable due to the possibility of the clutch being damaged. Accordingly, it is inevitably required to halt the power testing for the new vehicle until all the adjusting flywheels finish their rotation, resulting in prolongation of the power testing time.

SUMMARY OF THE INVENTION

Therefore, it is an object of the present invention to provide a power testing apparatus that can eliminate the above-noted defects inherent in the background art.

It is another object of the present invention to provide a power testing apparatus that can ensure a smooth engagement of clutch means at a desired timing without delay for adjusting an inertial load to be applied to a tested object.

To accomplish the above-noted and other objects, according to one aspect of the present invention, a power testing apparatus comprising: a dynamometer; rotation shaft means, associated with the dynamometer and an object to be tested, for transmitting power therebetween; a flywheel means, associated with the rotation shaft means, for forming an inertial load to be applied to the tested object through the rotation shaft means; a clutch means, associated with the rotation shaft means and the flywheel means, for controlling transmission of the inertial load from the flywheel means to the tested object through the rotation shaft means; and a brake means, associated with the flywheel means, for braking the flywheel means at a required timing.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Now, a power testing apparatus according to a preferred embodiment of the present invention will be described hereinbelow with reference to FIGS. 1 to 3.

Figure 1:
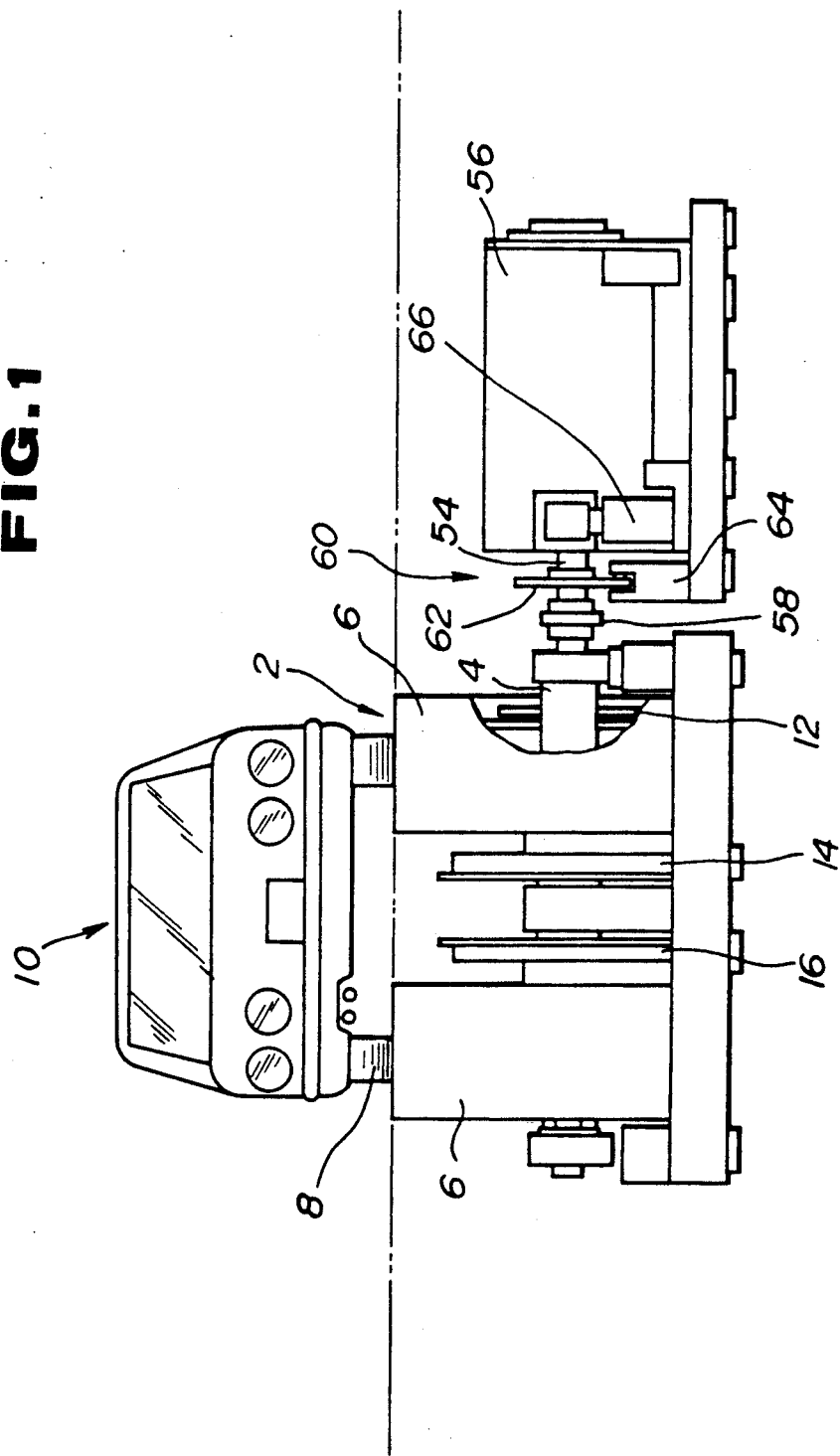
FIG. 1 is a schematic front view showing a power testing apparatus according to a preferred embodiment of the present invention.

FIG. 1 shows a chassis dynamometer for testing vehicular engine performance and so forth. In FIG. 1, a roller unit generally designated by a reference numeral 2 includes a rotation shaft 4 on which a pair of rollers 6 are fixedly mounted for co-rotation with the rotation shaft 4. On the rollers 6, driving wheels 8 of a vehicle 10 to be tested are placed for driving the rollers 6 by the vehicular driving wheels 8. As shown in FIG. 2 in detail, the roller unit 2 further includes a pair of fixed flywheels 12 each of which is mounted on the rotation shaft 4 such that each fixed flywheel 12 is securely fixed to a hub portion of the corresponding roller 6 for co-rotation therewith. Accordingly, each fixed flywheel 12 applies a predetermined inertial load to the tested vehicle 10 all through the power testing. On the other hand, first and second adjusting flywheels 14 and 16 respectively are releasably mounted on the rotation shaft 4.

Figure 2:
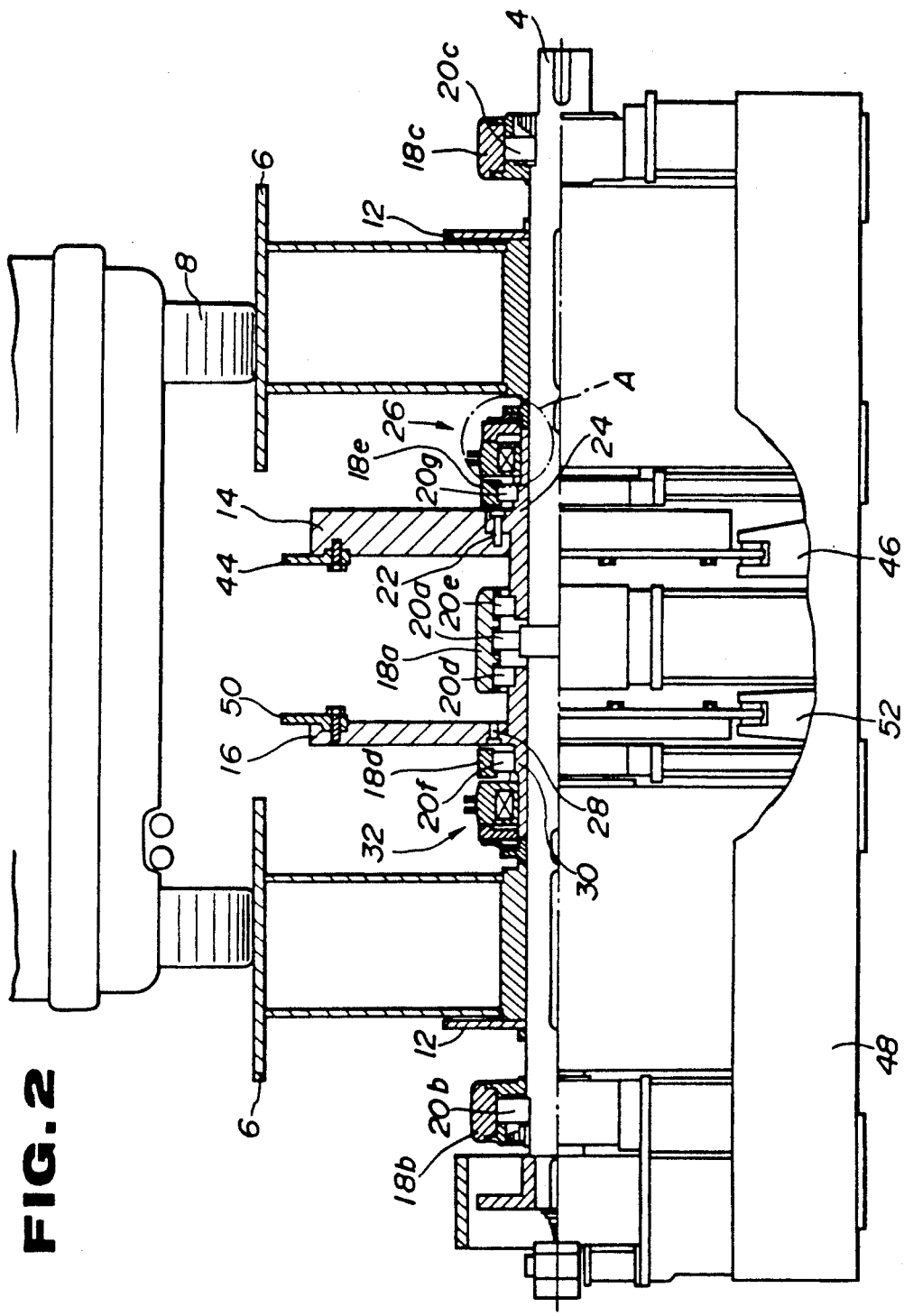
FIG. 2 is an enlarged partial sectional view showing a roller unit of FIG. 1.

Specifically, as shown in FIG. 2, the rotation shaft 4 is supported on three pedestals 18a, 18b and 18c through corresponding roller bearings 20a, 20b and 20c. The first adjusting flywheel 14 is fixed by means of a bolt 22 to a sleeve 24 which is supported on the pedestals 18a and 18e through corresponding roller bearings 20e and 20g, so that the first adjusting flywheel 14 is rotatable relative to the rotation shaft 4 when an electromagnetic toothed clutch 26 is released. Similarly, the second adjusting flywheel 16 is fixed by means of a bolt 28 to a sleeve 30 which is supported on the pedestals 18a and 18d through corresponding roller bearings 20d and 20f, so that the second adjusting flywheel 16 is also rotatable relative to the rotation shaft 4 when an electromagnetic toothed clutch 32 is released. In this preferred embodiment, the first adjusting flywheel 14 has a larger inertial mass than the second adjusting flywheel 16.

Figure 3:
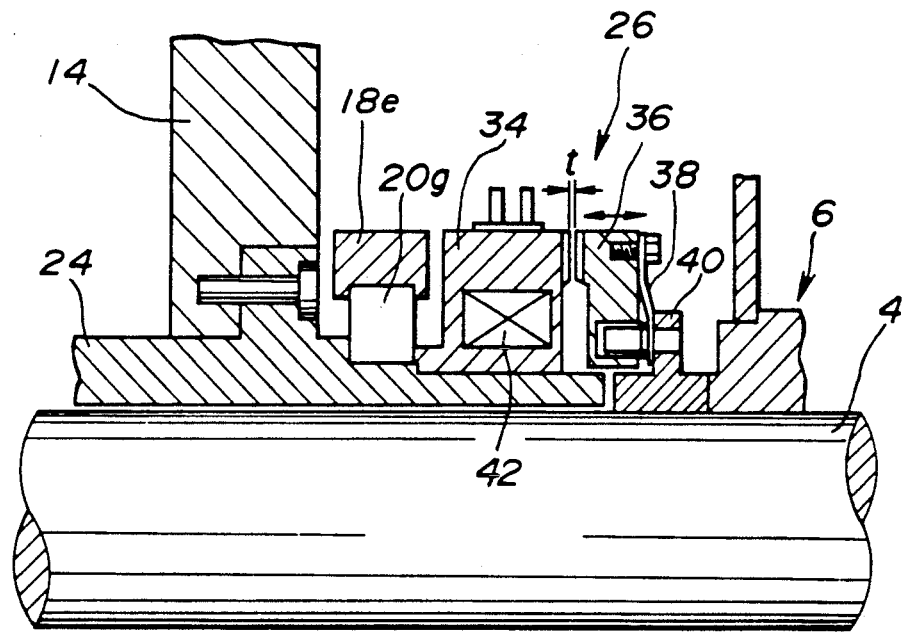
FIG. 3 is an enlarged sectional view showing a portion encircled by a dotted line A in FIG. 2.

As shown in FIG. 3 in detail, the electromagnetic toothed clutch 26 includes a first clutch element 34 and a second clutch element 36. The first and second clutch elements 34 and 36 have respective toothed surfaces which face toward each other with a predetermined axial gap t between the facing teeth. The first clutch element 34 is fixed to one end portion of the sleeve 24 remote from the sleeve 30 for co-rotation with the sleeve 24. The second clutch element 36 is fixed through a leaf spring 38 to a support member 40 which is securely fixed to the hub portion of the corresponding roller 6 for co-rotation therewith. By providing the spring connection between the second clutch element 36 and the support member 40, it is possible to improve a natural frequency of the power testing apparatus when the clutch 26 is engaged, so as to prevent a resonance of the tested vehicle 10. Further, the spring connection allows the axial gap t to be set smaller and ensures a smooth engagement between the first and second clutch elements 34 and 36 through their toothed surfaces by absorbing shock generated upon the engagement of the toothed surfaces and further absorbing axial displacement of the toothed surfaces due to a mounting or processing error of the first and second clutch elements 34 and 36. The first and second clutch elements 34 and 36 are engaged by applying an exciting current to a coil 42 to attract the second clutch element 36 toward the first clutch element 34, and are released with no current applied to the coil 42 to allow the second clutch element 36 to return its initial released position by a return force of the leaf spring 38.

As described above, when the clutch 26 is disengaged, the first adjusting flywheel 14 is rotatable relative to the rotation shaft 4. Accordingly, no inertial load is applied to the tested vehicle 10 through the rollers 6. On the other hand, when the clutch 26 is engaged, the first flywheel 14 is coupled to the rotation shaft 4 through the clutch 26 so as to co-rotate therewith to apply the inertial load to the tested vehicle 10.

It is to be appreciated that the structure and operation of the electromagnetic clutch 32 which is associated with the second flywheel 16 are substantially the same as those of the electromagnetic clutch 26, so that explanation thereof is omitted to avoid a redundant disclosure.

As shown in FIG. 2, an annular disc 44 is fixed to an outer peripheral portion of the first adjusting flywheel 14. Specifically, the annular disc 44 has at its radially innermost portion an annular projection which is fitted into a corresponding annular recess of the first adjusting flywheel 14, with a bolt passing therethrough to firmly fix the annular disc 44 to the first adjusting flywheel 14. A corresponding brake caliper 46 is fixedly mounted on a support base 48. Actuation of the brake caliper 46 is controlled by a drive unit (not shown) to hold the brake disc 44 with pressure so as to brake the first adjusting flywheel 14 at a required timing. Similarly, an annular disc 50 is fixed to the second adjusting flywheel 16 substantially in the same manner as the annular disc 44 and the first adjusting flywheel 14. A corresponding brake caliper 52 is also provided on the support base 48 substantially in the same manner as the brake caliper 46 and is actuated by the drive unit to hold the brake disc 50 with pressure so as to brake the second adjusting flywheel 16 at a required timing. The brake calipers 46 and 52 may be controlled by the drive unit at a common timing or independently.

Figure 4:
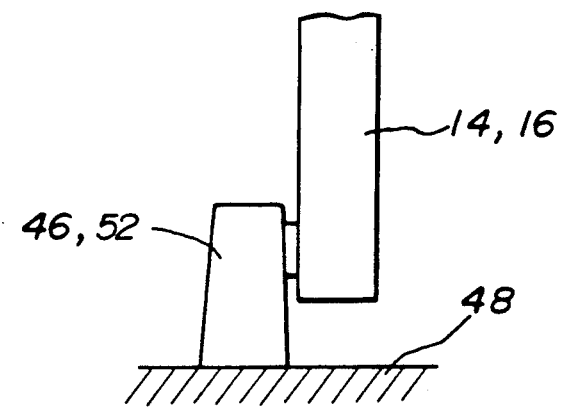
FIG. 4 is a schematic front view showing a modified flywheel braking unit.

FIG. 4 shows a modification of the foregoing brake mechanism, wherein the first and second adjusting flywheels 14 and 16 are respectively used as the brake discs, each of which receives a braking force from the corresponding brake caliper 46, 52 on one side thereof.

It is to be appreciated that, in place of the disc type brake as described above, brakes of other types, such as, a drum brake and an electromagnetic retarder may be employed.

Referring back to FIG. 1, the rotation shaft 4 is drivingly connected to a rotation shaft 54 of a dynamometer 56 through a coupling 58 and a disc brake 60. The disc brake 60 includes a brake disc 62 and a brake caliper 64 which is controlled by the drive unit (not shown) independently of the aforementioned brake calipers 46 and 52 to hold the brake disc 62 with pressure so as to brake the rotation shafts 4 and 54 at a required timing, for example, when finishing the power testing.

The dynamometer 56 also works as a driving load simulating parameters, such as aerodynamic resistance, road resistance, or the like, to be applied to the tested vehicle 10. The driving load is set in the dynamometer, as in the known way, by applying an exciting current to a stator element or an oscillator element to generate a magnetic field which exerts onto a rotor element integral with the rotation shaft 54 of the dynamometer 56. The dynamometer 56 includes a torquemeter 66 which measures an oscillation torque generated by the rotation of the rotor element, to derive the output power of the tested vehicle and so forth as in the known way.

As appreciated, in the preferred embodiment as described above, when it is required to engage the clutches 26, 32 while the adjusting flywheels 14, 16 are rotating idle, the drive unit actuates the brake calipers 46 and 52 to hold the corresponding brake discs 44, 50 or 14, 16 in FIG. 4, so that the corresponding adjusting flywheels are braked to stop the rotation thereof. Simultaneously, the rotation shafts 4 and 54 can also be braked by means of the brake 60. Accordingly, the engagements of the clutches 26, 32 are easily performed at a desired timing without delay, which overcomes the aforementioned defects inherent in the background art.

It is to be understood that this invention is not to be limited to the embodiments described above, and that various changes and modifications may be made without departing from the spirit and scope of the invention as defined in the appended claims.

For example, in the aforementioned preferred embodiment, though the flywheels are provided in the roller unit 2, the present invention is also applicable where the flywheels are arranged outside the roller unit. Further, the present invention is also applicable to such a power testing apparatus, such as, for a braking performance test, a power train performance test for a transmission, and so forth.

What is claimed is:

1. A power testing apparatus comprising:
   a dynamometer;
   rotation shaft means, connected to said dynamometer and an object to be tested, for transmitting power therebetween;
   flywheel means supported on said rotation shaft for rotation therewith, for forming an inertial load to be applied to said tested object through said rotation shaft means;
   clutch means, associated with said rotation shaft means and said flywheel means, for controlling transmission of said inertial load from said flywheel means to said tested object through said rotation shaft means; and
   brake means, associated with said flywheel means, for braking said flywheel means at a required timing.

2. A power testing apparatus comprising:
   a dynamometer;
   rotation shaft means, associated with said dynamometer and an object to be tested, for transmitting power therebetween;
   flywheel means, associated with said rotation shaft means, for forming an inertial load to be applied to said tested object through said rotation shaft means;
   clutch means, associated with said rotation shaft means and said flywheel means, for controlling transmission of said inertial load from said flywheel means to said tested object through said rotation shaft means; and
   brake means, associated with said flywheel means, for braking said flywheel means at a required timing; wherein said clutch means is engaged to couple said flywheel means with said rotation shaft means for applying said inertial load to said tested object, while disengaged to disconnect said flywheel means from said rotation shaft means to apply no inertial load from said flywheel means to said tested object, and wherein said brake means applies a braking force to said flywheel means when said clutch means is disengaged.

3. A power testing apparatus comprising:
   a dynamometer;
   rotation shaft means, associated with said dynamometer and an object to be tested, for transmitting power therebetween;
   flywheel means, associated with said rotation shaft means, for forming an inertial load to be applied to said tested object through said rotation shaft means;
   clutch means, associated with said rotation shaft means and said flywheel means, for controlling transmission of said inertial load from said flywheel means to said tested object through said rotation shaft means;
   brake means, associated with said flywheel means, for braking said flywheel means at a required timing; and
   second brake means for braking said rotation shaft means at a required timing, said second brake means being operated independently of said brake means for said flywheel means.

4. A power testing apparatus comprising:
   a dynamometer;
   rotation shaft means, associated with said dynamometer and an object to be tested, for transmitting power therebetween;
   flywheel means, associated with said rotation shaft means, for forming an inertial load to be applied to said tested object through said rotation shaft means wherein said flywheel means includes first and second flywheels each mounted on said rotation shaft means, and said brake means for said flywheel means includes first and second brakes, said first brake adapted to brake said first flywheel and said second brake adapted to brake said second flywheel;
   clutch means, associated with said rotation shaft means and said flywheel means, for controlling transmission of said inertial load from said flywheel means to said tested object through said rotation shaft means; and
   brake means, associated with said flywheel means, for braking said flywheel means at a required timing.

5. A power testing apparatus as set forth in claim 4, wherein said first and second brakes are operated at a common timing or independently of each other.

6. A power testing apparatus as set forth in claim 4, wherein said first brake includes a first annular brake disc fixed to an outer peripheral portion of said first flywheel, said first annular brake disc being selectively held by a brake caliper to brake said first flywheel, and said second brake includes a second annular brake disc fixed to an outer peripheral portion of said second flywheel, said second annular brake disc being selectively held by a brake caliper to brake said second flywheel.

7. A power testing apparatus as set forth in claim 4, wherein said first brake is constituted by a portion of said first flywheel and braking force applying means which selectively applies a braking force to said portion of said first flywheel to brake said first flywheel, and said second brake is constituted by a portion of said second flywheel and braking force applying means which selectively applies a braking force to said portion of said second flywheel to brake said second flywheel.

8. A power testing apparatus as set forth in claim 4, wherein said clutch means includes first and second clutches, said first clutch being engaged to connect said first flywheel to said rotation shaft means and being disengaged to disconnect said first flywheel from said rotation shaft, and said second clutch being engaged to connect said second flywheel to said rotation shaft means and being disengaged to disconnect said second flywheel from said rotation shaft.

9. A power testing apparatus as set forth in claim 8, wherein each of said first and second clutches is an electromagnetic clutch.

10. A power testing apparatus as set forth in claim 9, wherein said first clutch includes first and second clutch elements arranged in an axial direction of said rotation shaft means with a predetermined axial gap therebetween when said first clutch is disengaged, said first clutch element being arranged to co-rotate with said first flywheel and said second clutch element being arranged to co-rotate with said rotation shaft means, said second clutch element being supported relative to said rotation shaft means through spring means which is adapted to apply its spring force in said axial direction.

11. A power testing apparatus as set forth in claim 10, wherein said spring means is a leaf spring.

12. A power testing apparatus as set forth in claim 10, wherein said second clutch includes third and fourth clutch elements arranged in said axial direction with a predetermined axial gap therebetween when said second clutch is disengaged, said third clutch element being arranged to co-rotate with said second flywheel and said fourth clutch element being arranged to co-rotate with said rotation shaft means, said fourth clutch element being supported relative to said rotation shaft means through spring means which is adapted to apply its spring force in axial direction.

* * * * *